S. R. SAUNDERS & A. A. SCHMITZ.
GAS HAMMER.
APPLICATION FILED JULY 31, 1916.

1,237,827.

Patented Aug. 21, 1917.

BEST AVAILABLE COPY

Inventors
Samuel R. Saunders
Anthony A. Schmitz
By Erwin & Wheeler
Attorneys.

S. R. SAUNDERS & A. A. SCHMITZ.
GAS HAMMER.
APPLICATION FILED JULY 31, 1916.
1,237,827.
Patented Aug. 21, 1917.
2 SHEETS—SHEET 2.
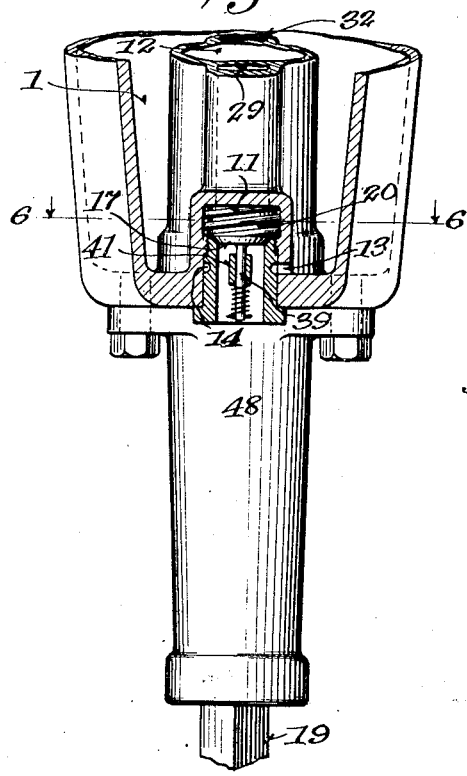
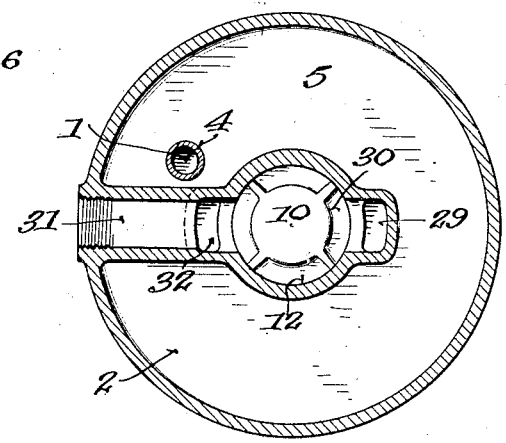
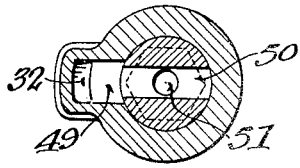
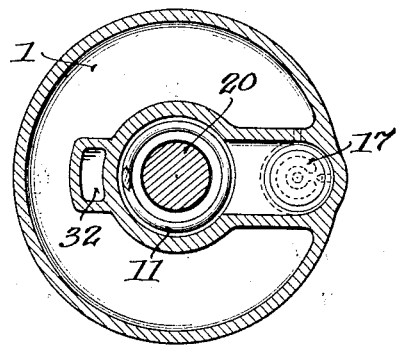
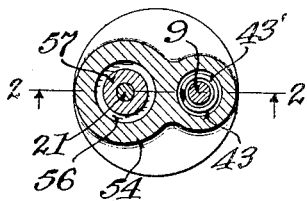
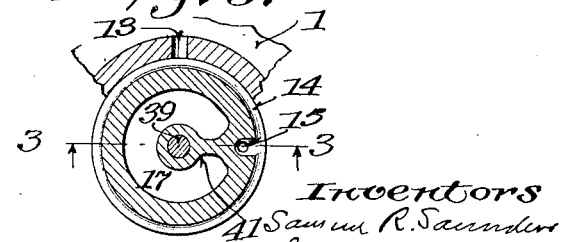
Inventors
Samuel R. Saunders
Anthony A. Schmitz
By Erwin & Wheeler
Attorneys.

UNITED STATES PATENT OFFICE.

SAMUEL R. SAUNDERS AND ANTHONY A. SCHMITZ, OF GREEN BAY, WISCONSIN.

GAS-HAMMER.

1,237,827.  Specification of Letters Patent.  Patented Aug. 21, 1917.

Application filed July 31, 1916. Serial No. 112,388.

*To all whom it may concern:*

Be it known that we, SAMUEL R. SAUNDERS and ANTHONY A. SCHMITZ, citizens of the United States, residing at the city of Green Bay, county of Brown, and State of Wisconsin, have invented new and useful Improvements in Gas-Hammers, of which the following is a specification.

Our invention relates to improvements in gas hammers, and the same is explained by reference to the accompanying drawings, in which—

Fig. 4 is a vertical section, drawn on line 4, 4 of Fig. 1.

Figure 1:
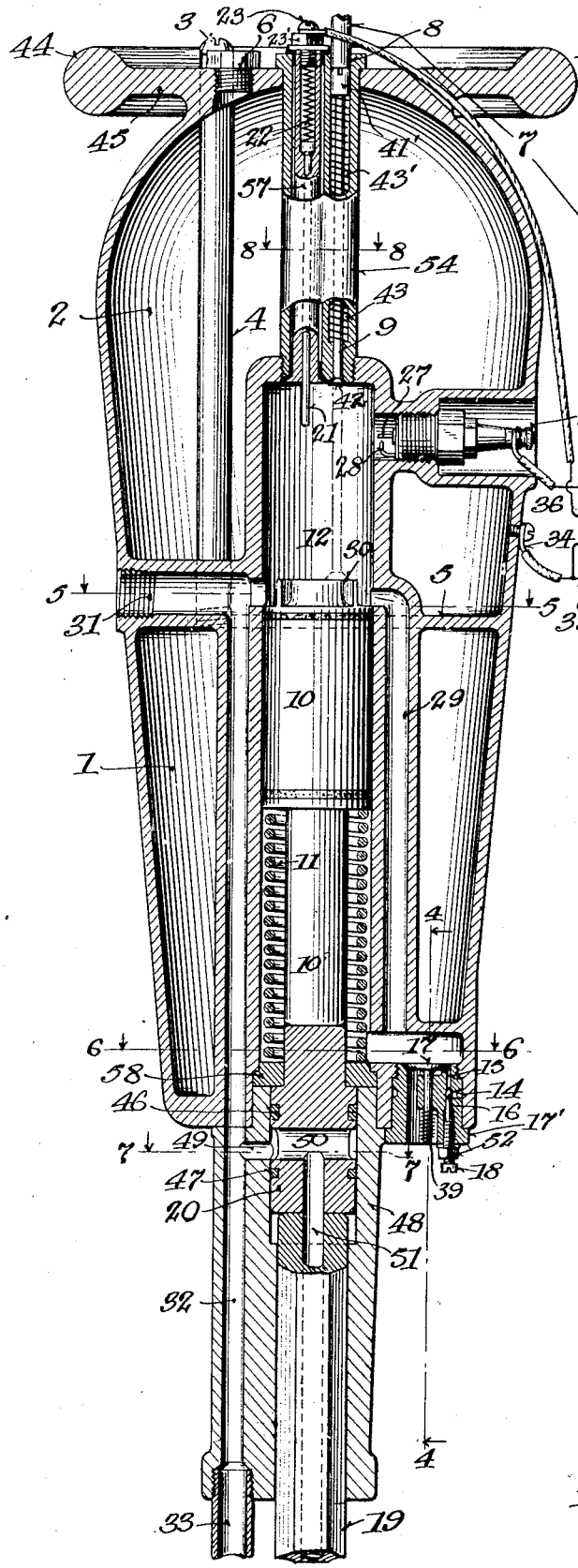
Figure 1 represents a vertical section.

Fig. 5 is a transverse section, drawn on line 5, 5 of Fig. 1.

Fig. 6 is a transverse section, drawn on line 6, 6 of Fig. 1.

Fig. 7 is a transverse section, drawn on line 7, 7 of Fig. 1.

Figure 2:
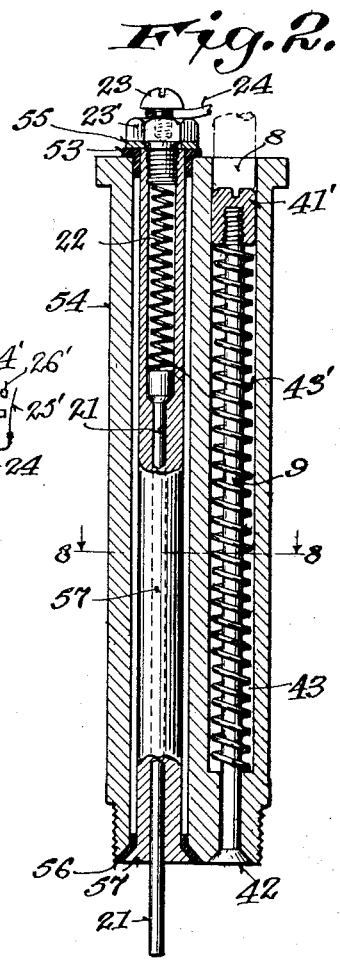
Fig. 2 is an enlarged detail in vertical section, drawn on line 2, 2 of Fig. 8.

Fig. 8 is a transverse section, drawn on line 8, 8 of Figs. 1 and 2, and

Figure 3:
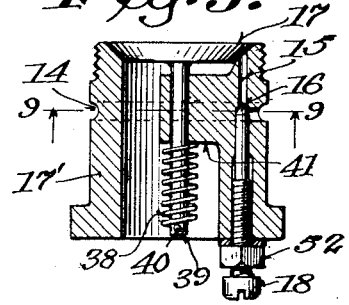
Fig. 3 is an enlarged vertical section, drawn on line 3, 3 of Fig. 9.

Fig. 9 is a transverse section, drawn on line 9, 9 of Fig. 3.

Like parts are referred to by the same reference numerals throughout the several views.

Preparatory to starting our device gasolene or other liquid fuel is placed in the chamber 1 and water is placed in the chamber 2. For brevity of description the liquid fuel is referred to as gasolene although other liquid fuel may be substituted therefor. Preparatory to placing gasolene in the chamber 1 the screw 3 is removed and gasolene is poured in the upper end of the tube 4, when it passes downwardly into the chamber 1, past the partition 5, as shown and indicated in Fig. 1. Water is placed in the chamber 2 by first removing the screw threaded plug 6, whereby the pipes and other mechanism in said chamber are prevented from becoming over-heated. When said liquids have been placed in the chambers 1 and 2 the screw 3 and plug 6 are again put in place, as shown in Fig. 1.

In starting the device the rod 7 is placed in the cylindrical duct 8, whereby the rod 9 is forced downwardly against the piston 10, and said piston is forced downwardly against the spiral spring 11, as indicated in Fig. 1. As the piston 10 is thus forced downwardly a partial vacuum is formed above the piston in the chamber 12 and the explosive mixture is compressed beneath the piston. When the piston has reached the limit of its downward movement the duct 29 is opened, whereby the explosive which has been previously compressed beneath the piston passes to the explosion chamber 12 above. As the explosive mixture thus enters the explosive chamber, the air in said explosive chamber is caused to escape through the exhaust duct 31, the tool 7 being removed, the piston 10 is forced upwardly by the recoil of said spring 11. As the piston is thus moved upwardly gasolene which has previously been placed in the chamber 1 is drawn into said chamber 12 below the piston, the gasolene passing through the duct 13, thence through the annular duct 14, thence upwardly through the duct 15, as shown in Fig. 9. The duct 15 is controlled at its lower end by the screw threaded valve 16, and at its upper end by the larger valve 17.

It will be understood that the valve 16 is manually operated by turning back the screw 18, which is clearly shown in Figs. 1 and 3. As the piston 10 moves downwardly the spring 11 is compressed, when motion is communicated to the tool holder 19 from said piston through the hammer 10' and the anvil 20, whereby the tool carried by the holder 19 is actuated. As soon as the pressure on the rod 7 is released the piston 10 is thrown upwardly by the recoil of the spiral spring 11. As said piston 10 is moved upwardly the gas and air which has previously passed into the chamber 12 is compressed, and as said piston approaches the upper end of said chamber 12 it is brought in contact with the rod 21. The rod 21 is forced downwardly by the spiral spring 22, which is interposed between said rod and the clamping screw 23 and the clamping nut 23'. As the piston 10 moves upwardly and contacts with rod 21 the battery circuit 24 is closed, whereby an electric spark passes between the terminals 27 and 28 thereby igniting the gas which has been partially compressed within the chamber 12, when an explosion takes place which causes the piston 10 to move downwardly again against the tension of the spiral spring 11. As the piston passes downwardly in the chamber 12 against the spiral spring 11 the gas and other contents are compressed therein and forced upwardly through the duct 29 when they are brought in contact with the side of the baffle projection 30, and they are thereby caused to pass upwardly, whereby the contents of the chamber 12 are forced outwardly through the duct 31 to the exterior. Part of the products of combustion is simultaneously caused to pass downwardly through the duct 32, when it passes from thence through the duct 33 and serves to blow away the dust and other refuse matter from the front of the tool carried by the holder 19.

34 is the ground wire which is connected at one end with the battery 26 through the wire 35 and at its other end to the walls of the chamber 2 by the screw 36 in the ordinary manner. 37 is a clamping nut by which the electric circuit wire 25 is connected with the terminal 27.

It will be understood that as the piston 10 moves upwardly and a partial vacuum is formed beneath it the valve 17 is raised, thereby permitting a quantity of air and gasolene to enter the chamber 12 beneath said piston. When, however, said piston moves downwardly, as previously stated, the valve 17 is again drawn to its seat by the recoil of the spiral spring 38. The spring 38 is supported upon the valve stem 39 being interposed between the pin 40 and the valve supporting shoulder 41. The upper end of the rod 9 is connected with a closely fitting plunger 41′, while a valve 42 is formed on the lower end of such rod and serves to close the chamber 43. 44 is a handle which is connected with our device through the disk 45, and said handle serves as a means of handling and operating such device. The anvil 20 is preferably provided with a plurality of packing rings 46 and 47, which form a tight joint between such anvil and the inclosing walls 48 of our device.

49, 50 and 51 are ducts communicating between the vertical duct 32 and the tool holder, whereby a portion of the products of combustion are free to pass downwardly through said tool holder for the purpose of removing dust or other refuse matter that may accumulate around the operating tool.

52 is a lock nut which serves to retain the valve 16 at any point of adjustment. 53 is an insulating collar which is interposed between the cylindrical member 54 and the disk 55. 56 is also an insulating collar which is interposed between the cylindrical member 54 and the member 57. 58 is a collar which is interposed between the anvil 20 and the inner walls of the chamber 1, and said collar serves as a bearing for supporting the spiral spring 11.

It will be understood that the piston 10 is at all times in electric circuit with the battery 26, through the wires 34 and 35 and screw 36, the circuit passing through the walls of our device to said piston and thence upwardly through the rod 21 inclosing sleeve 57 and spring 22, whereby an electric circuit is closed between the respective ends of said battery, said cylindrical member 57 being insulated at its upper end from the member 54 by the insulating collar 53, as previously mentioned, while the lower end of said cylindrical member 57 is insulated from said member 54 by the collar 56.

The sleeve 17′ upon which the valve 17 is supported not only serves as a means of leading gasolene to our device which passes, as stated, through the duct 15 when the valve 16 is opened but said sleeve 17′ also serves as a means of simultaneously leading air to our device which passes up against the lower side of the valve 17 and into the chamber 12 as said valve 17 is raised by each upward movement of the piston 10.

A spring 43′ surrounds the rod 9 and is interposed between the bottom of the chamber 43 and the plunger 41′ to normally hold said rod 9 in raised position and seating the valve 42.

It will be understood that when the piston 10 contacts with the rod 21 the electric circuit 24 closes, whereby a current passes from the battery 26 around the core 24′, whereby said core is energized and the vibrator 25′ is caused to contact with the terminal 26′, thus closing the secondary circuit 25, whereby the electric spark above referred to is produced between the terminals 27 and 28 in the ordinary manner, and whereby the gas in the cylinder 12 is ignited.

Having thus described our invention what we claim as new and desire to secure by Letters Patent, is:

1. In a device of the described class, the combination of a water chamber, a liquid fuel chamber, a transversely arranged partition separating said chambers, a cylinder extending through said liquid fuel chamber and partially through said water chamber, a reciprocating piston located in said cylinder, a spring adapted to move said piston in one direction, whereby an explosive mixture is compressed in said cylinder, an anvil located beneath said piston, means actuated by the movement of said piston as said explosive mixture is compressed for closing an electric circuit, whereby such mixture is ignited and said piston is moved in the opposite direction by the explosive force of said mixture against said piston, a tool holder connected with said anvil, means for introducing water into said water chamber, means for placing a liquid fuel in said fuel chamber, and means for leading gas and air into the compression space in said cylinder, whereby the explosive mixture is compressed and ignited by the movement of said piston and a blow is communicated to said anvil and tool holder.

2. In a device of the described class, the combination of a water chamber, a liquid fuel chamber, a transversely arranged partition separating said chambers, a cylinder extending through said liquid fuel chamber and partially through said water chamber, a reciprocating piston located in said cylinder, an intake duct, a baffle projection on said piston and adapted to extend beyond said intake duct when the latter is uncovered by the piston, an outlet duct for the escape of the products of combustion as the explosive mixture enters said cylinder, a spring adapted to move said piston in one direction, whereby an explosive mixture is compressed in said cylinder, an anvil located beneath said piston, means actuated by the movement of said piston as said explosive mixture is compressed for closing an electric circuit, whereby such mixture is ignited and said piston is moved in the opposite direction by the explosive force of said mixture against said spring, a tool holder connected with said anvil, means for introducing water into said water chamber, means for placing a liquid fuel in said fuel chamber, and means for leading gas and air into the compression space in said cylinder, whereby the explosive mixture is compressed and ignited by the movement of said piston and a blow is communicated to said anvil and tool holder.

3. In a device of the described class, the combination of a water chamber, a liquid fuel chamber, a transversely arranged partition separating said chambers, a cylinder extending through said liquid fuel chamber and partially through said water chamber, a reciprocating piston located in said cylinder, an intake duct, a baffle projection on said piston and adapted to extend beyond said intake duct when the latter is uncovered by the piston, an outlet duct for the escape of the production of combustion as the explosive mixture enters said cylinder, a spring adapted to move said piston in one direction, whereby an explosive mixture is compressed in said cylinder, an anvil located beneath said piston, means actuated by the movement of said piston as said explosive mixture is compressed for closing an electric circuit, whereby such mixture is ignited and said piston is moved in the opposite direction by the explosive force of said mixture against said spring, a tool holder connected with said anvil, a hammer interposed between said piston and anvil, means for introducing water into said water chamber, means for placing a liquid fuel in said fuel chamber, and means for leading gas and air into the compression space in said cylinder, whereby the explosive mixture is compressed and ignited by the movement of said piston and a blow is communicated to said anvil and tool holder.

4. In a device of the described class, the combination of a water chamber, a liquid fuel chamber, a transversely arranged partition separating said chamber, a cylinder extending through said liquid fuel chamber and partially through said water chamber, a reciprocating piston located in said cylinder, a spring adapted to move said piston in one direction, whereby an explosive mixture is compressed in said cylinder, an anvil located beneath said piston, means actuated by the movement of said piston as said explosive mixture is compressed for closing an electric circuit, an electric battery, circuit wires communicating between said battery and electric terminals located in close proximity to the explosive mixture in said cylinder, whereby such mixture is ignited and said piston is moved in the opposite direction by the explosive force of said mixture against said piston, a tool holder connected with said anvil, means for introducing water into said water chamber, means for placing a liquid fuel in said fuel chamber, and means for leading gas and air into the compression space in said cylinder, whereby the explosive mixture is compressed and ignited by the movement of said piston and a blow is communicated to said anvil and tool holder.

5. In a device of the described class, the combination of an explosive chamber, a piston located in said chamber, a hammer connected with said piston, an anvil connected with said hammer, means for automatically producing explosions in said explosion chamber, whereby the explosive force is caused to act on said piston as the latter reaches the limit of its movement in one direction; valve mechanism coöperating with the piston, whereby the explosive mixture is drawn into the piston chamber and expelled therefrom during the reciprocation of said piston, suitable means for conducting the explosive mixture to said cylinder, suitable means for expelling the products of combustion after the explosion has taken place in said cylinder, a duct communicating at one end with the exhaust duct and at its opposite end through an aperture formed in said tool holder, whereby refuse matter is removed from in front of the tool carried by said holder, a second duct communicating between said exhaust duct and a duct parallel to said tool holder, whereby a portion of the products of combustion are discharged in front of the tool carried by said holder, and whereby the refuse matter is displaced in front of the tool operated by said holder.

6. In a device of the described class, a cylinder for the combustion of gases having suitable gas inlet and exhaust openings, a water chamber surrounding one end of said cylinder, a chamber for combustible fuel surrounding the other end of said cylinder, means for controlling the supply and exhaust to and from said cylinder, means for igniting the gases within the cylinder, and means for communicating an impact from said piston to the tool holder of said device.

In testimony whereof we affix our signatures in the presence of two witnesses.

SAMUEL R. SAUNDERS.
ANTHONY A. SCHMITZ.

Witnesses:
Louis C. Tickler,
Otis J. Hansen.